Figure 1:
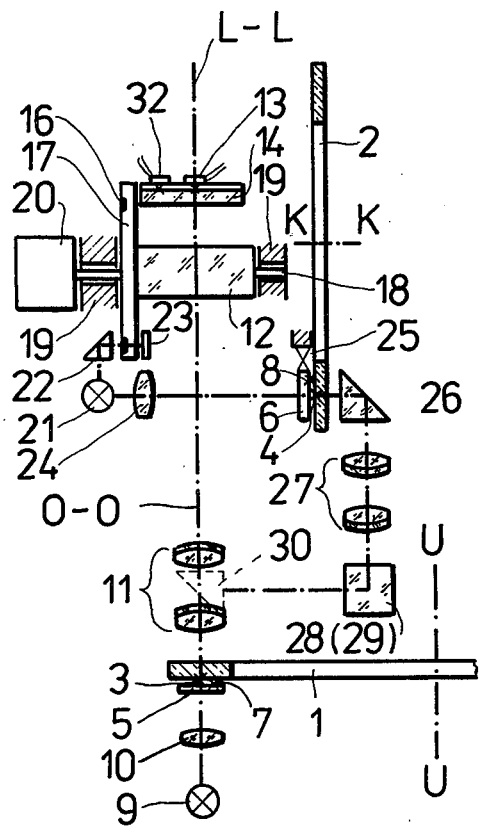

United States Patent [19]

Feist

[11] 4,355,902
[45] Oct. 26, 1982

[54] ARRANGEMENT FOR DETERMINING THE ERRORS THE VERTICAL AXIS OF A SURVEYING DEVICE

[76] Inventor: Wieland Feist, 6, Erfurter Strasse, Jena, District of Gera, German Democratic Rep.

[21] Appl. No.: 188,841

[22] Filed: Sep. 30, 1980

[30] Foreign Application Priority Data

Oct. 1, 1979 [DD] German Democratic Rep. ... 215908

[51] Int. Cl.³ .................. G01B 11/14; G01C 1/02; G01C 1/06; G01D 3/04
[52] U.S. Cl. .................. 356/375; 250/231 SE; 356/139; 356/147; 356/150
[58] Field of Search ................ 356/372–373, 356/375, 138–139, 141, 147–149, 150, 152; 33/283–284, 366; 250/231 SE

[56] References Cited

U.S. PATENT DOCUMENTS

| 2,837,956 | 6/1958 | Schneider | 356/148 |
| 3,068,741 | 12/1962 | Werner | 356/139 |
| 3,154,626 | 10/1964 | Sisson | 356/375 |
| 4,136,955 | 1/1979 | Aeschlimann et al. | 356/141 |

FOREIGN PATENT DOCUMENTS

| 138100 | 10/1979 | German Democratic Rep. | 250/231 SE |
| 2027203 | 2/1980 | United Kingdom | 356/375 |

*Primary Examiner*—William H. Punter

[57] ABSTRACT

The invention relates to an arrangement for determining the vertical axis of a surveying device including a horizontal and a vertical circle each being provided with an index. The two indexes are related to each other and the resulting departure, if any, is measured either visually or physically. By virtue of the inventional arrangement additional means for determining the vertical axis of a surveying device such as inclinometers are eliminated.

1 Claim, 6 Drawing Figures

ARRANGEMENT FOR DETERMINING THE ERRORS THE VERTICAL AXIS OF A SURVEYING DEVICE

The invention relates to an arrangement for determining the vertical axis of a surveying device being provided with a horizontal and a vertical circle.

The horizontal and vertical angles are each indicated by an index arranged in the plane of the respective circle, the index of the vertical circle being stabilized by a plummet.

The position of each index in the respective graduated circle interval is measured by micrometric means.

The vertical axial error is either indicated for manual correction or is fed into a computer for automatical error determination to eliminate the influence upon other measuring values.

A previous surveying apparatus including a device for determining errors of the vertical axis or of the horizontal position permits the computation of a corrected measuring value out of a measuring result and a horizontal value error.

The computer used is an accessory unit which requires space for installation at the surveying device and which has to be adjusted additionally. Thus the device is rendered bulky and liable to interferences.

A further known device defines the leveling error by use of a height index plummet for stabilising the height circle indication.

A telescope is adjusted to a definite angle of height and the leveling is performed at three directions displaced relative to each other by about 100°.

When the indication of the height circle of the third direction differs from that of the first one then a leveling error prevails, which has to be involved when a very precise leveling measurement has to be performed.

This method is disadvantageous because the same angle of height has to be maintained in the course of the error determination.

This disadvantage is particularly of importance when several direction measurements have to be performed from one position and when, due to insufficient stability of the stand of the leveling device the vertical axis of the latter is subject to considerable variations. This requires a control of the inclination of the vertical axis in the course of direction measurements.

It is an object of the invention to obviate the above disadvantages.

It is a further object of the invention to provide an arrangement for defining and involving the vertical axis or leveling error which neither requires any additional inclination meter, nor necessitates to interrupt the leveling or direction finding for determining the vertical axis of the level stand.

It is a further object of the invention to provide a method which permits automatisation of the determination and measuring procedure.

These and other objects are realised in an arrangement for determining deviations from the vertical axis of a surveying device which is provided with a horizontal circle and a vertical circle.

Each of said two circles has an index which are in mutually relation, the relative space between the two indexes is measured by micrometers.

The mutual relation of the two indexes is achieved by imaging the latter into one and the same plane.

Alternatively the position of the indexes are detected by opto-electrical means, the resulting pulses thereof are compared.

When the vertical axis of the device does not depart from normal the resulting images and pulses, respectively, have a definite local or time distance from each other.

Preferably, they coincide with each other. Thus, an error of the vertical axis results in a departure from a definite position.

The inventional arrangement is particularly for use in angular measuring devices with photoelectric detection of the graduate circle indication, comprising a digital computer and a continuously operating micrometer for automatic interpolation of the position of the indexes in the graduated circle intervals of the vertical and horizontal circle.

The departure of the two indexes from each other is continuously measured by the optical micrometer.

A program fed into the digital computer selects from the numerous direction measurements taken from one standpoint of the device those directions measured by 0°, 100° and 200° to continuously determine the errors of the vertical axis, and detects the associated interpolation values for the position differences between the index of the horizontal and of the vertical circle.

Thus variations of the error of the vertical axis are continuously detected and, if any, the correction value is involved in the horizontal angle finding operation.

The visual determination of the vertical axis error, if any, requires a fusing of the images of the two indexes by optical means.

Figure 2:
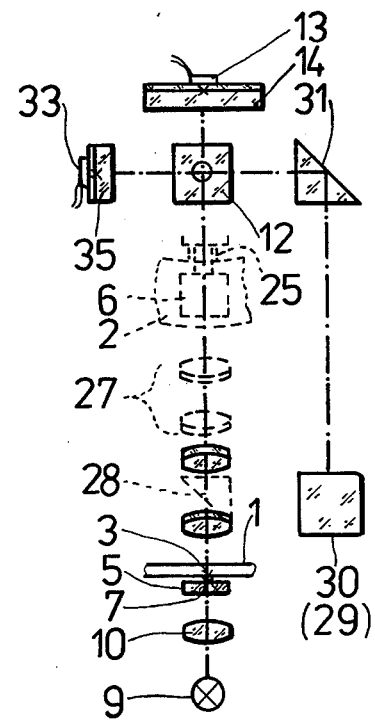
Figure 4:
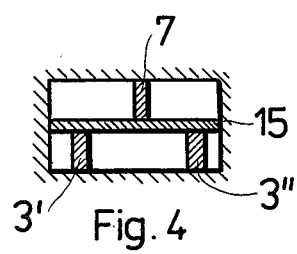
Figure 5:
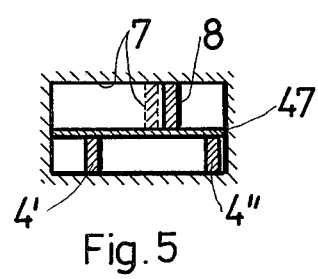
Figure 3:
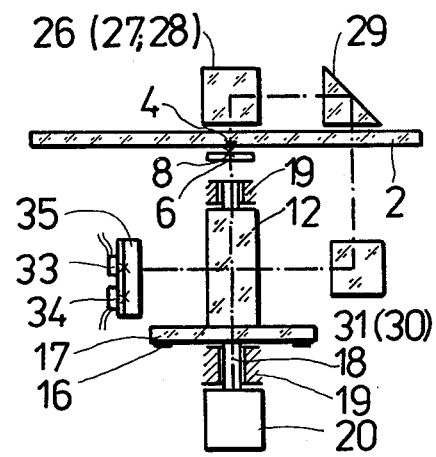
Figure 6:
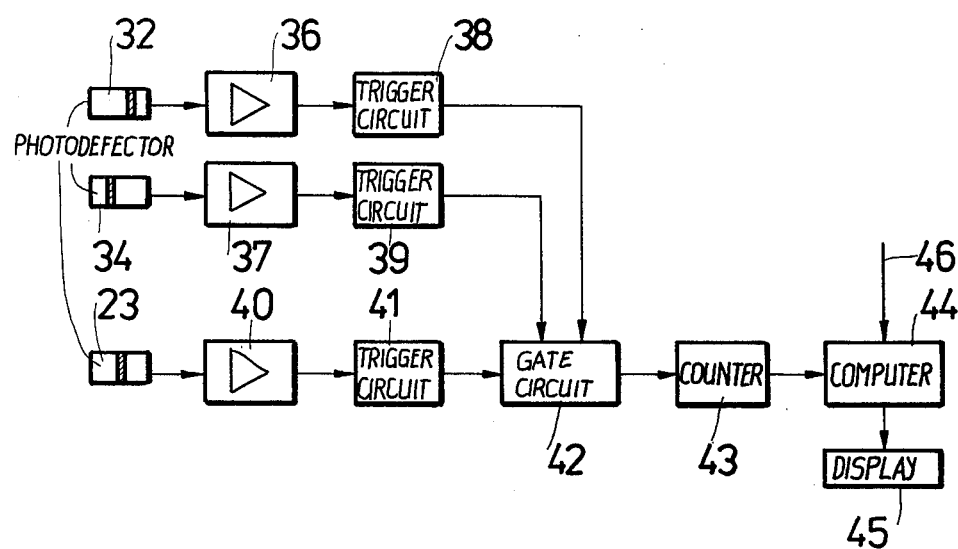

In order that the invention may be more readily understood reference is made to the accompanying drawings which illustrate diagrammatically and by way of example two embodiments thereof and where FIG. 1 is a schematical front view of the arrangement for reading a graduated circle, FIG. 2 the same in lateral view, FIG. 3 a top view of the arrangement of FIG. 1, FIG. 4 a section of the reading window of the horizontal circle, FIG. 5 a section of the reading window of the vertical circle, and FIG. 6 a flow chart for an electronic detection of the vertical axis error.

In FIGS. 1 to 3 two graduated circles 1 and 2 of an angular measuring device are shown which are provided with graduations 3 and 4, respectively. Index mounts 5, 6 with indexes 7, 8, respectively, for indication of the graduated circle position are associated to the graduated circle 1 and 2, respectively.

The index mount 6 is suspended by a cross-spring joint 25.

The graduated circle axes are K—K and U—U, respectively. A light source 9 and a condenser lens 10 serve to illuminate the index 7 and the adjacent section of the graduated circle 3.

The section as shown, for example, in FIG. 4 comprises the index 7 and the two neighbouring graduation lines 3' and 3" of the graduation 3.

The section is imaged via a lens system 11 and an optical plano-parallel plate 12 into the plane of the photodetectors 13, 32, mounted on a transparent carrier 14. When the section is imaged, a separating edge 15 is displayed between the neighbouring lines 3' and 3" on the one hand, and the index 7 on the other hand.

The plano-parallel plate 12 and a disc 17 are mounted on an axle 18 which, in turn, is seated for rotation in seatings 19 and driven by a servo-motor 20.

The disc 17 is provided with a graduation 16. A light source 21 via prism 22 always illuminates that portion of the disc 17 which is adjacent a photodetector 23.

Furthermore, the light source 21 illuminates via a condenser lens 24 the index 8 and that portion of the graduation circle 2 which is shown in detail in FIG. 5 carrying the two graduation lines 4' and 4" and an index 8.

The latter and the graduation lines 4' and 4" are imaged via a deviating prism 26, an objective 27, deviating prisms 28, 29, 30, 31 and the plano-parallel plate 12 into the plane of the photodetectors 33, 34 which are mounted on a transparent carrier means 35. The image also exhibits a separating edge 47 between the index 8 on the one hand and the two graduation lines 4', 4" on the other hand. 7' designates the departure of the index 7 from the index 8.

The photodetectors 32 and 34 for detecting the indexes 7, 8 are followed by an amplifier 36 and 37, respectively, and a trigger circuit 38, 39, respectively.

The photodetector 23 is followed by an amplifier 40 and a trigger circuit 41.

The latter is connected via a gate circuit 42 and a counter 43 to a computer 44, to which a display unit 45 is associated.

The trigger circuits 38 and 39 as well as the trigger unit 41 are connected to the gate circuit 42.

The photodetectors 13 and 33 are connected to the computer 44 via similar circuit elements as disclosed in connection with the photodetectors 23, 32, 34 which is indicated by an arrow 46.

In operation, the servo-motor 20 rotates the plano-parallel plate 12 about an axis at right angles to the optical axis O—O of the objective 11, thus the graduation lines 3', 3" of the circle graduation 3 and the index 7 repeatedly sweep the photodetector 32 and 13, respectively, and the index 8 and the graduation lines 4' and 4" of the circle graduation 4 repeatedly sweep the photodetectors 34 and 33, respectively.

The disc 16 rotates with the plano-parallel plate 12 thus the graduation 16 rotates past the photodetector 23 which produces interpolation pulses indicative of the position of the index 7 within the interval 3'/3" and of the position of the index 8 within the interval 4'/4".

Said interpolation pulses are fed into the amplifier 40 for amplification, the amplified pulses are fed into the trigger circuit 41 for square-wave generation and further into the gate-circuit 42.

In analogy thereto, the amplifier 36 and the trigger circuit 38 process the pulses produced in the photodetector 32 by the index 7, and the amplifier 37 and the trigger circuit 39 process the pulses produced in the photodetector 34 by the index 8.

The rotation of the plano-parallel plate 12 produces one pulse in each photodetector 32, 34 and a number of pulses in the photodetector 23 which corresponds to the number of division lines of the circle graduation 16, determining the fine division of the circle graduation intervals 3'/3" and 4'/4", respectively.

The pulses from the photodetectors 32 and 34 processed through the amplifier and the trigger circuit are also fed into the gate circuit 42.

The pulse from the photodetector 32 opens the gate 42 to receive the continuously applied pulses from the photodetector 23 which thus can be fed into the counter 43.

The photodetector 34 pulse renders the gate circuit 42 into the OFF-state for the pulses from the photodetector 23 and stops the counting operation.

The counted pulses are fed into the computer 44 which computes the correction value according to the inherent program.

Furthermore, the pulses for the horizontal and vertical angles produced by the photodetectors 13, 33 and 23 and the plano-parallel plate 12 are fed into the computer 44, which is indicated by the arrow 46.

The computer 44 delivers a correction value for the horizontal angle and controls the display of the correction value and the vertical angle value of the display unit.

When, due to gravity, the index carrier 6 is in parallel to the vertical axis L—L the correction value is zero.

The vertical axis L—L coincides with the optical axis O—O in the drawings.

Hence, the pulses are simultaneously produced in the photodetectors 32 and 34, since the indexes 7 and 8 are coincident with respect to time.

The photodetector pulses 32 and 34 are simultaneously applied to the gate circuit 42 so that no correction value is produced.

When the pulses from the detectors 32 and 34 are not simultaneously produced, a correction value results.

It is irrelevant which of the two indexes 7 and 8 is related to the other one.

Furthermore, it is feasible to detect the positions of the indexes 7, 8 by optical means in that one of the indexes, index 7 in FIG. 5, is imaged adjacent the index 8.

I claim:

1. Arrangement for determining errors of the vertical axis of a surveying device
    comprising
    a horizontal circle,
    a vertical circle,
    a first index for defining a reading portion on said horizontal circle,
    a second index for defining a reading portion on said vertical circle,
    a first optical system,
    a second optical system,
    an optical plano-parallel plate seated for rotation,
    a servo-motor mechanically connected to said plano-parallel plate,
    a first photodetector for said reading portion on said horizontal circle,
    a second photodetector for said first index,
    a third photodetector for said reading portion on said vertical circle,
    a fourth photodetector for said second index,
        said reading portion on said horizontal circle, said first index, said first optical system, said plano-parallel plate, said first and second photodetector being in optical alignment,
        said first optical system being for imaging said reading portion on said horizontal circle and said first index into a plane defined by said first and said second photodetector,
        said reading portion on said vertical circle, said second index, said second optical system, said plano-parallel plate, said third and fourth photodetector being in optical alignment, said second optical system being for imaging said reading portion on said vertical circle and said second index into a plane defined by said third and fourth photodetector, an interpolation unit including a fifth photodetector, being connected to said plano-parallel plate, said fifth photodetector being for producing an interpolation pulse sequence in dependence on the rotations of said plano-parallel plate, a gate circuit, a counter being connected to said fifth photodetector via said gate circuit, said second and fourth photodetector being connected to said gate circuit and alternatingly producing ON-pulses and OFF-pulses for said gate circuit, said counter being for counting the intepolation pulses between said ON and OFF pulses, a computer being connected to said counter and to said first and said third photodetector for computing a corrected reading, a display unit for displaying the corrected reading, said display unit being connected to said computer.

* * * * *